(12) United States Patent
Milevsky et al.

(10) Patent No.: US 8,781,937 B2
(45) Date of Patent: Jul. 15, 2014

(54) OPTIMAL PORTFOLIO WITHDRAWAL DURING RETIREMENT IN THE PRESENCE OF LONGEVITY RISK

(75) Inventors: Moshe A Milevsky, Toronto (CA); Huaxiong Huang, Markham (CA)

(73) Assignee: Qwema Group, Inc., Toronto (CA)

( * ) Notice: Subject to any disclaimer, the term of this patent is extended or adjusted under 35 U.S.C. 154(b) by 0 days.

(21) Appl. No.: 13/602,996

(22) Filed: Sep. 4, 2012

(65) Prior Publication Data

US 2014/0067722 A1  Mar. 6, 2014

(51) Int. Cl.
*G06Q 40/00* (2012.01)
*G06Q 40/08* (2012.01)
*G06Q 40/06* (2012.01)

(52) U.S. Cl.
CPC .............. *G06Q 40/08* (2013.01); *G06Q 40/06* (2013.01)
USPC ............................................ 705/36 R; 705/4

(58) Field of Classification Search
CPC ................................. G06Q 4/08; G06Q 40/06
USPC .................................................. 705/36 R, 4
See application file for complete search history.

(56) References Cited

U.S. PATENT DOCUMENTS

| | | | |
|---|---|---|---|
| 7,120,601 B2 | 10/2006 | Chen | |
| 7,401,040 B2 | 7/2008 | Sloan | |
| 8,010,388 B2 | 8/2011 | Joyce | |
| 8,015,090 B1 | 9/2011 | Borzych | |
| 8,150,755 B2 | 4/2012 | Caputo | |
| 8,185,462 B2 | 5/2012 | Torre | |
| 8,234,132 B2 | 7/2012 | Kravitz | |
| 2005/0144108 A1 | 6/2005 | Loeper | |
| 2006/0149651 A1 | 7/2006 | Robinson | |
| 2011/0112947 A1 | 5/2011 | Liautaud | |
| 2013/0097097 A1* | 4/2013 | Valentino et al. | 705/36 R |
| 2014/0046871 A1* | 2/2014 | Silverman | 705/36 R |
| 2014/0067719 A1* | 3/2014 | Peterson | 705/36 R |

OTHER PUBLICATIONS

Andersen, S, Harrison, G.W., M.I. Lau, and E.E. Rutstrom, "Eliciting Risk and Time Preferences", Econometrica, vol. 76 (Issue 3), pp. 583-618, May 2008.
Babbel, D.F., and C.B. Merill, "Rational Decumulation" (Working Paper), Wharton Financial Institutions Centre, 2006.
Bengen, W.P., "Determining Withdrawal Rates Using Historical Data", Journal of Financial Planning, vol. 7 (No. 4), Oct. 1994, pp. 171-181.

(Continued)

*Primary Examiner* — Thomas M Hammond, III
(74) *Attorney, Agent, or Firm* — Banner & Witcoff, Ltd

(57) ABSTRACT

A method, system, and medium for recommending an optimal withdrawal amount, for a given period, from a retiree's portfolio accounts comprised of relatively risky and relatively safe financial assets used to finance retirement. The user supplies information about the retiree's personal characteristics, including age, gender, and health status. Details of the retiree's financial situation are also supplied, including the retiree's total liquid wealth, the current value of relatively risky and relatively safe assets, and any after-tax pension and other annuity income. Risk (standard deviation of return), return (expected rate of return based on a lognormal or other random distribution), or other measurable differentiating characteristics are retrieved for a portfolio comprised of relatively risky assets. A valuation rate is also retrieved. Based on these inputs, an actuarial discount rate is computed, an optimal wealth depletion time is located, and the optimal withdrawal amount is computed and displayed to the user.

39 Claims, 12 Drawing Sheets

(56) References Cited

OTHER PUBLICATIONS

Bodie, Z., Detemple, J.B., Orbuta, S., and Walter, S., "Optimal Consumption-Portfolio Choice and Retirement Planning", Journal of Economic Dynamics and Control, vol. 28 (No. 6), Mar. 2004, pp. 1115-1148.

Butler, M., "Life-Cycle Consumption: A Textbook Example", Economic Theory, vol. 17 (No. 1), Jan. 2001, pp. 209-221.

Cooley, P.L., Hubbard, C.M., and Walz, D.T., "Retirement Savings: Choosing a Withdrawal Rate That Is Sustainable", AAII Journal, vol. 20 (No. 2), Feb. 2008, pp. 16-21.

Fisher, I., "The Theory of Interest: As Determined by Impatience to Spend Income and Opportunity to Invest It", 1930, The MacMillan Company, New York.

Huang, H., Milevsky, M.A., and Salisbury, T.S., "Optimal Retirement Consumption with a Stochastic Force of Mortality", Insurance: Mathematics and Economics, vol. 41, pp. 282-291.

Leung, S.F., "The Existence, Uniqueness, and Optimality of the Terminal Wealth Depletion Time in Life-Cycle Models of Saving under Uncertain Lifetime and Borrowing Constraint", Journal Economic Theory, vol. 134 (No. 1), May 2007, pp. 470-493.

Leung, S.F., "Uncertain Lifetime, the Theory of the Consumer, and the Life Cycle Hypothesis", Econometrica, vol. 62 (No. 5), Sep. 1994, pp. 1233-1239.

Merton, R.C., "Optimum Consumption and Portfolio Rules in a Continuous-Time Model", Journal of Economic Theory, vol. 3 (No. 4), Dec. 1971, pp. 373-413.

Milevsky, M.A., "The Calculus of Retirement Income: Financial Models for Pensions and Insurance", 2006, Cambridge University Press, United Kingdom.

Milevsky, M.A., Huang, H., "Spending Retirement on Planet Vulcan: The Impact of Longevity Risk Aversion on Optimal Withdrawal Rates", Financial Analysts Journal, vol. 67(2), 2010, pp. 45-58.

Modigliani, F., "Life Cycle, Individual Thrift, and the Wealth of Nations", American Economic Review, vol. 76 (No. 3), Jun. 1986, pp. 297-313.

Scott, Jason S., Sharpe, William F., Watson, John G., "The 4% Rule—At What Price?", Journal of Investment Management (JOIM), Q3, 2009.

Yaari, M.E., "Uncertain Lifetime, Life Insurance, and the Theory of the Consumer", Review of Economic Studies, vol. 32 (No. 2), Apr. 1965, pp. 137-150.

\* cited by examiner

FIG. 3

Table 1: *Portfolio Withdrawal Amount (Net of Pension)*

| Pension/Age | 65 | 70 | 75 | 80 |
|---|---|---|---|---|
| $0 | $61,920 | $60,553 | $57,905 | $53,944 |
| $20,000 | $68,810 | $66,899 | $62,749 | $57,517 |
| $50,000 | $76,790 | $74,071 | $68,731 | $60,489 |
| $100,000 | $87,820 | $83,268 | $76,146 | $64,623 |

Table 2: *Impact of Longevity Risk Aversion on Optimal Withdrawal*

| Age | gamma = 5.00 (20% Risky) | gamma = 2.50 (40% Risky) | gamma = 1.67 (60% Risky) | gamma = 1.25 (80% Risky) |
|---|---|---|---|---|
| 65 | $59,200 | $65,040 | $69,690 | $73,730 |
| 70 | $58,350 | $63,460 | $67,560 | $70,760 |
| 75 | $57,360 | $61,510 | $63,880 | $65,670 |
| 80 | $56,110 | $57,860 | $58,430 | $57,780 |

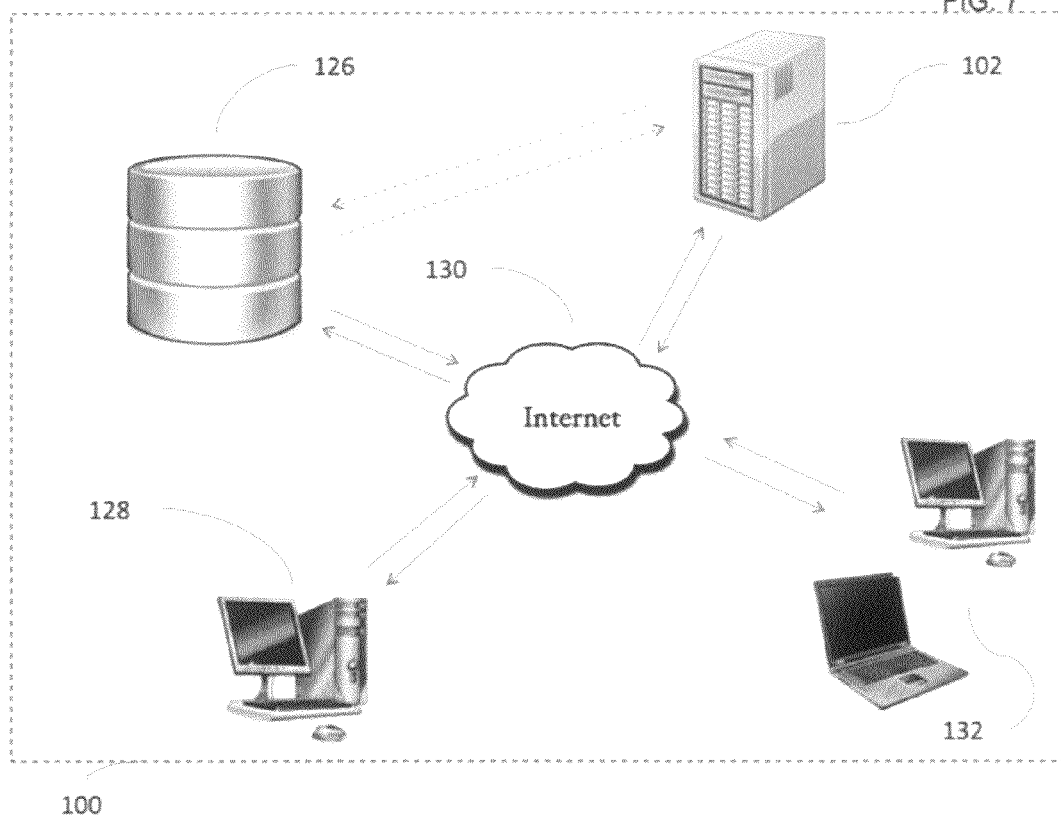

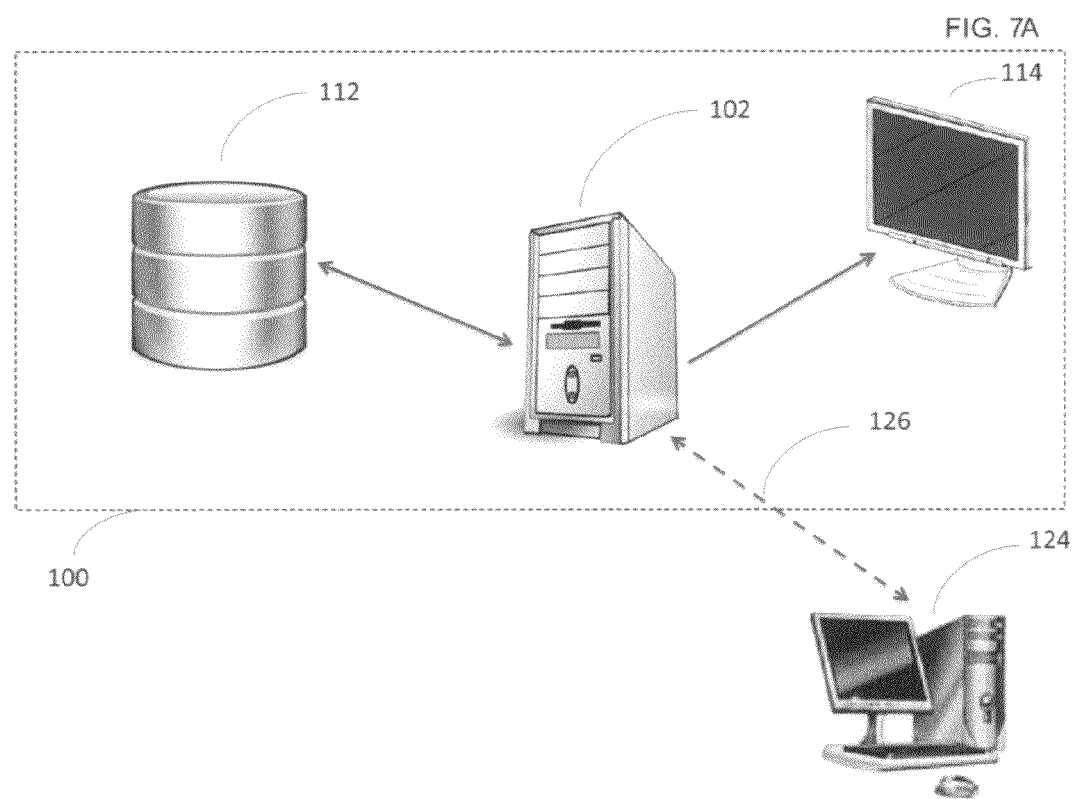

OPTIMAL PORTFOLIO WITHDRAWAL DURING RETIREMENT IN THE PRESENCE OF LONGEVITY RISK

FIELD OF THE INVENTION

The present invention comprises a method and system for recommending the amount a retiree should withdraw (optimal withdrawal amount) from investment portfolio accounts comprised of financial assets and products, over a given period, for the purpose of financing retirement. More specifically, the present invention is a method and system for recommending the optimal withdrawal amount, for a given period, from a portfolio of assets or products used to finance retirement, taking into account the retiree's comprehensive level of risk aversion and any pension or other life annuity income of the retiree.

BACKGROUND OF THE INVENTION

The global population is ageing and the elderly are living longer than ever before. The *National Vital Statics Report*, published by the National Center for Health Statistics, indicates that global human life expectancy increased from 59.7 years in 1930 to approximately 78.3 years by 2011. The increase can be attributed to improvements in infectious disease control, public health initiatives and medical innovations. Furthermore, the size of the elderly population, both in absolute and relative terms, has been steadily increasing. The United States Census Bureau, in a 2010 census brief titled "Age and Sex Composition: 2010" (issued in May 2011), reported that there were 40.2 million people aged 65 and older in the United States in 2010, representing roughly 13% of the U.S. population. To add some perspective, the elderly population increased 15.1% from 2000 to 2010. The median age in the U.S. has increased from 29.5 years in 1960 to 37.2 in 2010.

From a retirement planning perspective, increased longevity poses a number of challenges for those approaching retirement. Beyond the anxiety that surrounds the question of how much will be needed to finance retirement needs, retirees must also figure out how much to periodically withdraw from their investment portfolios to finance their retirement in the presence of longevity risk. More simply, preparing for retirement requires planning for two phases: saving and spending. Whereas there are an abundance of tools and algorithms aimed at helping people determine how much to save for retirement, there are very few that help people manage spending during retirement, while also taking into account the various risks people face and their attitudes and preferences with respect to those risks. The greatest risk, in the context of retirement, is known as longevity risk.

Longevity risk embodies more than the risk of living longer than anticipated; it is more accurately described as the risk created by the uncertainty inherent in trying to forecast one's expected lifetime or longevity. A casual glance at the obituaries section reveals that some people remain alive well into their late 90s and even live to become centenarians, whereas others die a few years after reaching retirement age, and some even earlier. Further complicating the situation is the fact that the standard deviation (dispersion) around the average life expectancy has increased over time. For example, using data from the mortality database of the University of California, Berkeley, and the Max Planck institute for Demographic Research, a 65-year old male in the year 1933 was expected to live up to his $77^{th}$ birthday. The standard deviation of remaining life was 7.2 years. In 2007, a 65-year old male was expected to live up to his $82^{nd}$ birthday; the standard deviation of remaining life was 8.5 years. The increase in both the expected age at death and the standard deviation of remaining life support the conclusion that longevity risk has increased over time. The figures displayed in Appendix A provide a graphical display of the expected age at death and the standard deviation of remaining life for males and females of varying ages from 1933 to 2007.

Oddly enough, despite the presence of longevity risk, the common approach in making retirement spending recommendations is to advise that a retiree deplete a fixed percentage of their retirement nest egg each year. This "fixed rate" approach makes a number of arguably unrealistic assumptions, the most critical being that the retiree will live for a pre-determined period of time. Thus, for example, the popular 4% rule that recommends a retiree withdraw $4 adjusted for inflation each year for every $100 in the retirement portfolio, is meant to sustain a constant standard of living from that portfolio for 30 years of retirement. This approach ignores the issue of longevity risk since, in assuming the retiree lives for 30 years, it fails to account for the term structure of mortality—the probability of survival in any given year given one's age, gender, and health status. More importantly, it does not account for the reality that people possess different attitudes towards risk, which is a key component of our unique methodology. A retiree who is longevity risk averse may decide to reduce spending early-on in retirement, whereas a retiree with a higher risk tolerance might opt for higher spending today thereby running the risk that they will live longer than anticipated and deplete their resources during retirement. More simply, fixed percentage spending rules, such as the 4% rule, are not able to account for different attitudes towards risk. Equally problematic is the assumption that retiree's do not have preferences regarding longevity risk, which is completely inconsistent with a century of research in basic economics.

In contrast to the fixed spending approach, which we believe is incomplete and misleading, financial economists advise that retirees spend in a manner that is consistent with so-called utility function maximization or some other function that allows for a tradeoff between risk and return. In particular, the utility maximizing level of spending is a function of the retiree's time and risk preferences as well as projections of future economic, financial and market conditions. It is well established in the financial economics literature—see for example Robert Merton (1990)—that the resulting optimal spending strategy, assuming constant relative risk aversion (CRRA), requires that the retiree invest in a constant risk portfolio and spend in proportion to the total value of his/her retirement assets. Since the retiree's wealth is dependent on market factors, spending rates are not constant. In other words, most financial economists appreciate that spending and the corresponding withdrawals from the portfolio should change in response to market conditions, the actual (optimal) withdrawal pattern involves some relatively complicated mathematics, and is computationally cumbersome. In particular, it involves the computation of a so-called optimal wealth depletion time (WDT), which is explained in the section describing the illustrated embodiments. One of our main innovations has been to overcome the computational difficulties in a commercially viable manner.

While optimal retirement spending during retirement is discussed quite extensively in the academic literature, there is a noticeable absence of commercially available tools that retirees can use to determine the amount they should withdraw from their retirement portfolios, consistent with a rational tradeoff between risk and potential return. Furthermore, there are no commercially available tools that capture the impact of longevity risk aversion on optimal portfolio withdrawals, while also adjusting the optimal withdrawal amount to reflect the retiree's other pension or life annuity income. Our methodology for solving the optimal withdrawal amounts from various portfolios during retirement fills these commercial gaps and should help millions of retirees better manage the risks inherent in retirement income planning.

Another distinguishing feature of our methodology is the way it manages wealth drawdowns and, eventually, depletions over time. Whereas practitioners attempt to minimize the chance of the retiree's wealth being depleted prior to death, or some fixed time horizon, our methodology does not attempt to arbitrarily extend the so-called optimal wealth depletion time (WDT). In fact, in certain cases, where the retiree receives substantial pension or other annuity income, it is conceivable that the optimal spending trajectory results in an optimal wealth depletion time (WDT) that is prior to the date of death. In other words, depending on a retiree's level of longevity risk aversion and annuity income, it may be advisable for the retiree to deplete his or her portfolio accounts prior to death and live entirely off of pension annuity income. While the optimal wealth depletion time is obviously a personal preference, and highly dependent on one's attitude towards creating a legacy and financial bequest, this approach and methodology is lacking in the existing methodologies.

SUMMARY OF THE INVENTION

The invention provides a system, method, and machine-readable medium for recommending an optimal withdrawal amount, for a given period, from a retiree's portfolio accounts, comprised of relatively risky and relatively safe assets, used to finance retirement. Under this method, the user supplies information about the retiree's personal characteristics, including the retiree's age, health status, and gender. Details of the retiree's financial situation are also supplied, including the retiree's total liquid wealth, the current value of relatively risky and relatively safe assets, and any after-tax pension and other annuity income. Risk (standard deviation of return), return (expected rate of return based on a lognormal or other random distribution), or other measurable differentiating characteristics are retrieved for a portfolio comprised of relatively risky assets. A valuation rate is also retrieved.

In the preferred embodiment, the retiree's level of overall risk aversion is used as a proxy for their specific level of longevity risk aversion, which is computed using a function of the expected rate of return for a portfolio of relatively risky assets, the valuation rate, the standard deviation of return for a portfolio of relatively risky assets, and the percentage of the retiree's total wealth comprised of relatively risky assets. Having computed the retiree's implied level of longevity risk aversion, the retiree's optimal wealth depletion time, which is a function of the retiree's wealth, after-tax pension and other annuity income, the valuation rate, the retiree's level of longevity risk aversion, the retiree's probability of survival, and the retiree's actuarial discount rate, is solved over multiple iterations or using any one of an assortment of search methods. In the preferred embodiment, the actuarial discount rate is a function of the retiree's age, probability of survival, the valuation rate, the retiree's subjective discount rate, and a time variable.

Once the optimal wealth depletion time has been located, the retiree's optimal withdrawal amount is computed as a function of said retiree's wealth, after-tax pension and other annuity income, optimal wealth depletion time, the valuation rate and the actuarial discount rate. The resulting withdrawal recommendation is displayed or otherwise communicated to the user. In the preferred embodiment, it can be displayed as a single withdrawal from one portfolio. In alternative embodiments, it can be displayed as a collection of withdrawals from a multitude of portfolios, with each portfolio having a different regulatory or tax classification Systems and media are provided to carry out the above embodiments of the invention.

BRIEF DESCRIPTION OF THE DRAWINGS

FIG. 3 shows the optimal portfolio withdrawal amount (OWA) for retirees at different ages, levels of pension income, and levels of longevity risk aversion;

FIG. 7 is a schematic diagram of a system for carrying out the invention;

FIG. 7A is a schematic diagram of an alternative system for carrying out the invention;

DETAILED DESCRIPTION OF THE ILLUSTRATED EMBODIMENTS

Figure 1A:
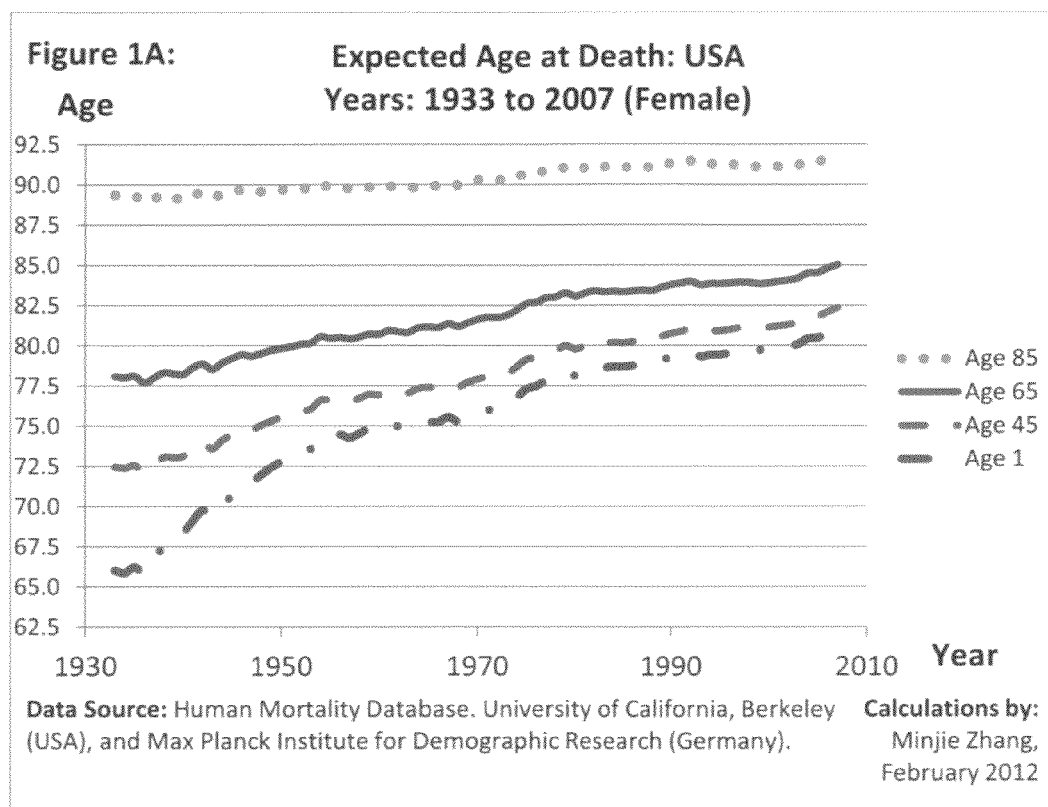
FIG. 1A is a chart showing the expected age at death for females in the United States from 1933 to 2007.
Figure 1B:
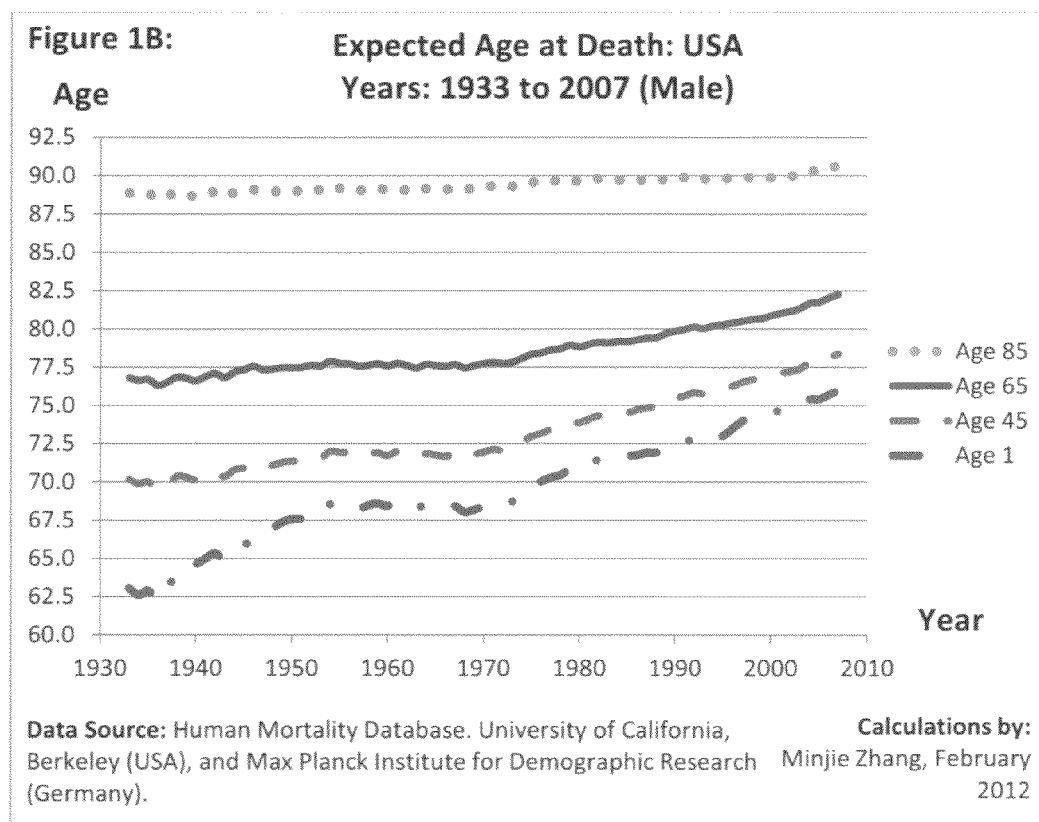
FIG. 1B is a chart showing the expected age at death for males in the United States from 1933 to 2007.
Figure 2A:
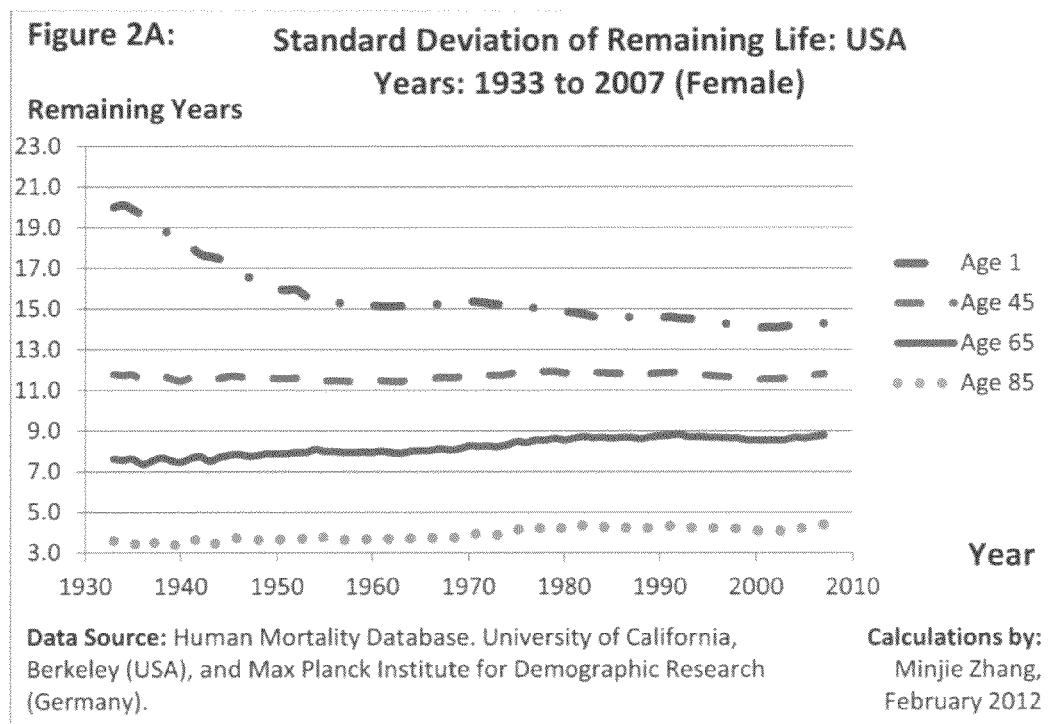
FIG. 2A is a chart showing the standard deviation of remaining life for females in the United States from 1933 to 2007.
Figure 2B:
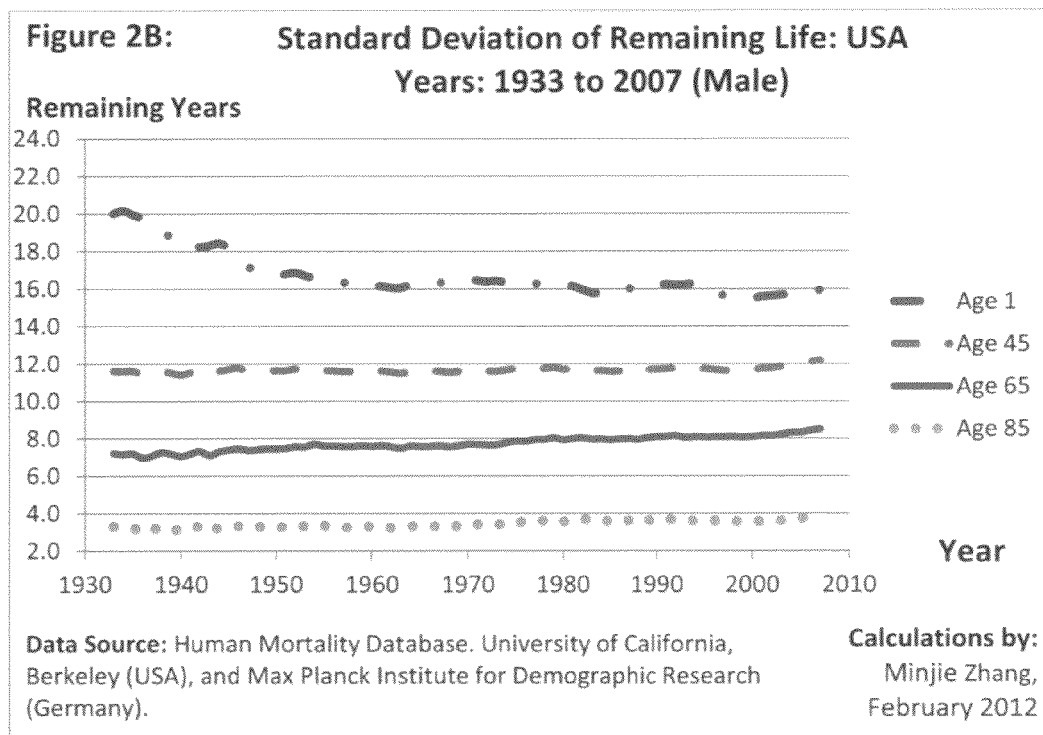
FIG. 2B is a chart showing the standard deviation of remaining life for males in the United States from 1933 to 2007.

In the present invention, the investor's optimal withdrawal amount is influenced by longevity risk aversion—the "fear" of living longer than anticipated and possibly depleting one's financial resources. The illustrated embodiment describes the invention using two primary categories of assets: relatively risky financial assets and relatively safe financial assets. In addition, the invention accounts for any pension or other annuity income the retiree may receive.

The optimal withdrawal amount (OWA) at time t can be expressed as follows:

$$OWA(t) = OWA(0) * (EXP(k*t)) * (P(t,x,L,M,B))^{(1/LRA)} \quad (1)$$

where $k = (r - SDR)/LRA$

In the above expressions:
OWA(0) = the initial optimal withdrawal amount (withdrawals at t=0)
P(t,x,L,M,B) = the objective probability of a person of age x surviving to time t parameterized using Gompertz mortality parameters L, M, and B LRA=the retiree's level of longevity risk aversion
r=the valuation rate
SDR=the retiree's subjective discount rate In the illustrated embodiment, it is assumed that the retiree's subjective discount rate, SDR, equals the valuation rate, and hence, k=0. Put another way, it is most natural to assume that adults use current interest rates as a proxy for their own discounting of future-to-present.

Another important feature of equation A1 is that OWA(t)=OWA(0) where t=0. Since we are primarily interested in the initial optimal withdrawal amount, by definition the optimal amount of withdrawals at t=0, we need only determine the value of OWA(0).

The initial optimal withdrawal amount, OWA(0), can be expressed as follows:

$$OWA(0)=N1/D1 \quad (2)$$

Where:

$$N1=(W+(PAI(0)/r))*(EXP(r*WDT))-(PAI(0)/r)$$

$$D1=(a(WDT,x,r,k,L,M,B))*(EXP(r*WDT))$$

In the above expression:
W denotes the wealth level
PAI(0) denotes the initial level of periodic after-tax pension and other annuity income
r denotes the valuation rate
WDT denotes the optimal wealth depletion time
a(WDT,x,r,k,L,M,B) denotes the retirement age "price" of a life-contingent pension annuity that pays a real $1 a year until death or time WDT, whichever comes first The optimal wealth depletion time, WDT, is obtained by substituting Equation (1) into Equation (2) and searching the resulting nonlinear equation over the range (0,D), where D is the time of death, for the value of WDT that satisfies the following condition:

$$OWA(WDT)-PAI(0)=0$$

In other words, if an optimal wealth depletion time exists, then for spending to remain smooth at that point, which is part of the foundation of life-cycle theory, it must converge to PAI(0). More simply, the retiree's wealth will have been depleted at the point where the only remaining source of funding in retirement is pension and/or annuity income. Mathematically, the optimal wealth depletion time, WDT, satisfies the following equation:

$$(N1/D1)*N2=PAI(0) \quad (3)$$

Where:

$$N1=(W+(PAI(0)/r))*(EXP(r*WDT))-(PAI(0)/r)$$

$$D1=(a(WDT,x,r,k,L,M,B))*(EXP(r*WDT))$$

$$N2=(EXP(k*WDT))*(P(t,x,L,M,B))^\wedge(1/LRA)$$

As mentioned above, LRA is the retiree's level of longevity risk aversion. In the illustrated embodiment, LRA satisfies the following equation:

$$LRA=N1/D1 \quad (4)$$

Where:

$$N1=(Mu-r)/Sigma$$

$$D1=Alpha$$

In the above expression:
Mu denotes expected rate of return on a portfolio of relatively risky assets
r denotes the valuation rate
Alpha denotes the percentage of the retiree's total wealth allocated to relatively risky assets
Sigma denotes the standard deviation of returns for a relatively risky portfolio of assets By scaling the market Sharpe ratio (excess return per unit of risk—variable N1 above) to reflect the retiree's exposure to relatively risky assets (variable D1 above), we are able to objectively view the retiree's relative financial risk aversion, which is also used as a proxy for the retiree's level of longevity risk aversion. The underlying assumption is that individuals possess a universal attitude towards any and all risks. Applying this assumption, an individual willing to risk losing money in the stock market in hopes that their portfolio will grow over time would also be willing to risk living a long time and having to reduce their standard of living in the future in exchange for a higher standard of living today.

In the illustrated embodiment, the conditional probability of a person of age x surviving t years under the Gompertz Law of Mortality, P(t,x,L,M,B), can be expressed as follows:

$$P(t,x,L,M,B)=EXP((-L*t)+(EXP((x-M)/B))*(1-EXP(t/B))) \quad (5)$$

In the above expression:
L denotes the hazard rate due to accidents
M denotes the modal value of life (e.g., 80 years)
B denotes the dispersion coefficient (e.g., 10 years) of the future lifetime random variable The Gompertz-Makeham mortality model parameters denoted by letters L, M, and B are calculated by fitting a Gompertz-Makeham survival probability curve to the mortality table that is available from known sources, such as the Society of Actuaries. Since the mortality tables contain death probabilities, the survival probability is calculated by subtracting from 1.0. Mathematically, many techniques are available for locating the parameters of the Gompertz-Makeham distribution. Particularly, in the preferred embodiment, we use the Gauss-Newton method to calculate the parameters.

The present invention incorporates the following decision factors:
(i) Retiree's risk tolerance;
(ii) Retiree's age, gender, and health status;
(iii) Retiree's conditional probability of survival;
(iv) Retiree's initial wealth;
(v) Retiree's after-tax pension and annuity income;
(vi) Retiree's time preferences;
(vii) After-tax risk and return characteristics of relatively risky and risk-free assets In the illustrated embodiment, the mean (Mu) and standard deviation (Sigma) have been used to define the expected rate of return and risk, respectively. The use of mean and standard deviation in turn assumes the use of a standard lognormal distribution. The probability density function for a lognormal distribution is:

$$LogNormalPDF(x;Mu,Sigma)=(1/(((2*Pi)^\wedge(1/2))*Sigma*x))*EXP(-((LN(x)-Mu)/Sigma)^\wedge 2)/2), x>=0$$

In the illustrated embodiment, investments in relatively risky assets have a random return X within a distribution defined by two moments: a standard mean and a statistical measure of variation. Note, however, that other distributions can be used: standard normal and other distributions that have more or less skewness and kurtosis. For example, a standard normal distribution with no skew can be used. The probability density function for a standard normal distribution is:

$$N(x;Mu,Sigma)=(1/(((2*Pi)\hat{\,}(1/2))*Sigma))*EXP((-((x-Mu)/Sigma)\hat{\,}2)/2)$$

Another possibility is the Johnson distribution, which is a set of statistical distributions parameterized by four variables. The four variables can be represented by applying the following transformation to the standard normal distribution, Z:

$$X=c+d*(Phi\hat{\,}(-1))*((Z-a)/b) \Leftrightarrow Z=a+b*Phi*((X-c)/d)$$

Other distributions can be found in William H. Greene, Econometric Analysis, Prentice Hall, 3$^{rd}$ ed. (1997).

Determining the Optimal Level of Withdrawals

Figure 4:
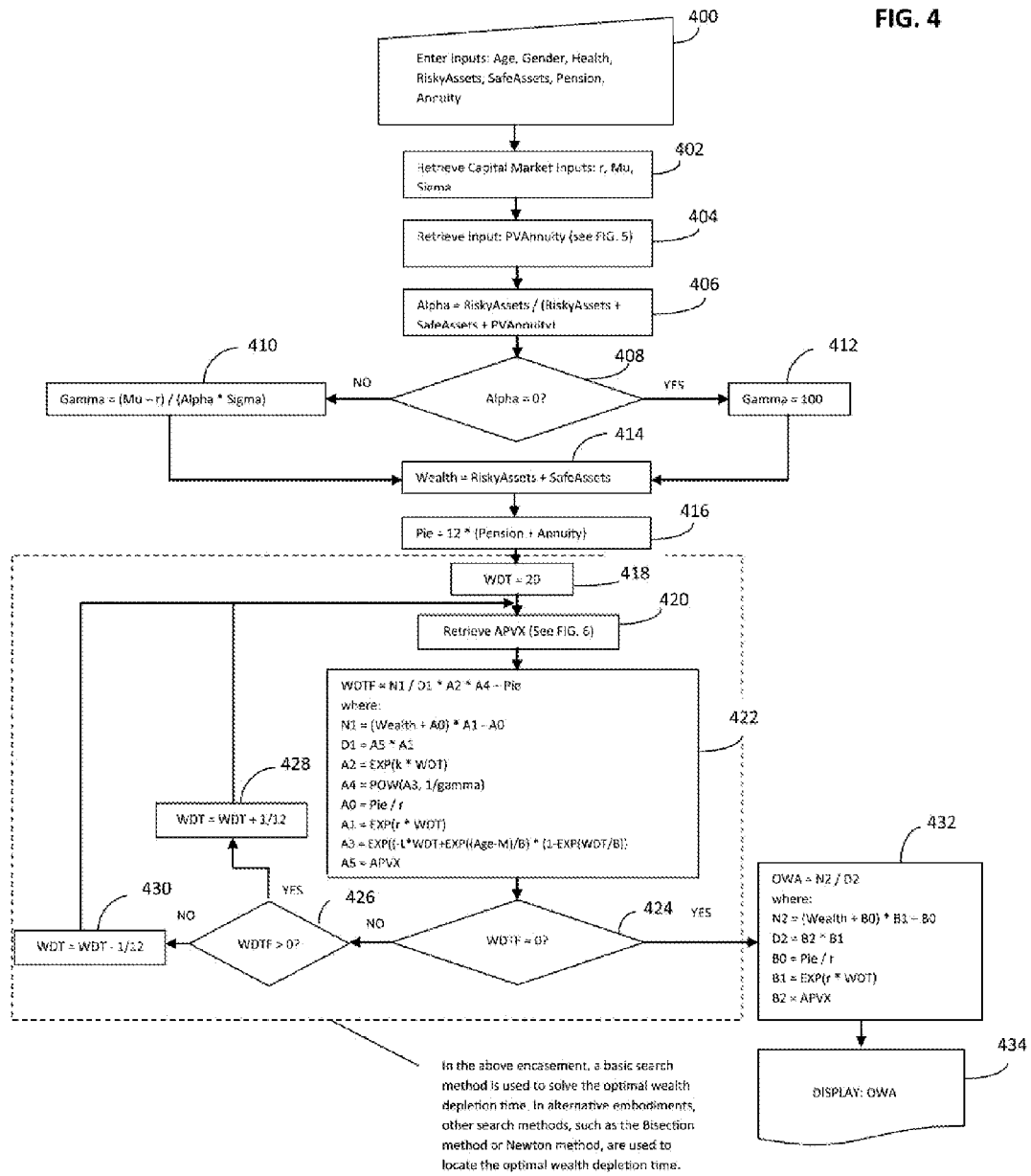
FIG. 4 is a flowchart of an embodiment of the invention in which a basic search method is used to solve the optimal wealth depletion time.

FIG. 4 is a flowchart presenting an overview of one embodiment of the present invention. The first step 400 is the supply of various inputs, including the retiree's age, gender, health status, the amount invested in relatively risky and relatively safe assets, and any periodic after-tax pension or other annuity income. According to the present embodiment, the user will supply each of these inputs.

In step 402, various capital markets inputs are retrieved from a database, including the valuation rate, the expected rate of return on a portfolio or index comprised of relatively risky assets, and the standard deviation of returns for said portfolio or index.

Figure 5:
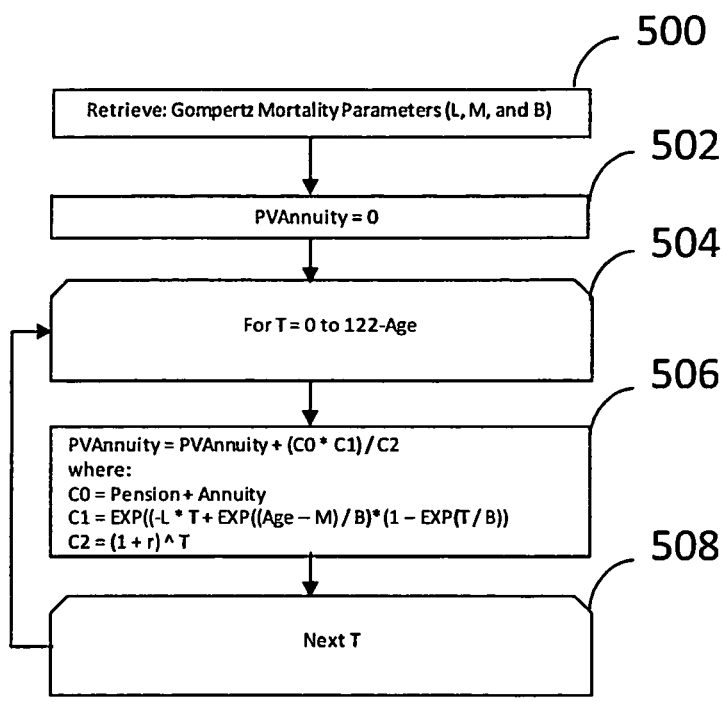
FIG. 5 is a flowchart detail of FIG. 4 illustrating steps to be taken in calculating the present value of the retiree's pension and other annuity income.

In the next step 404, the system computes the present value of the retiree's after-tax pension or other annuity income, PVAnnuity. FIG. 5 presents one method for computing PVAnnuity. The first step 500 is the retrieval of Gompertz mortality parameters (L, M and B) from a database. The next step 502 is to set the initial value of PVAnnuity equal to 0. In the subsequent step 504, the range of values for T, a time counting variable, is set. In the present embodiment, T cannot exceed 122 less the age of retiree since it is highly improbable that the retiree will live beyond 122 years of age. In the next step 506, PVAnnuity is recalculated using the following formula:

$$PVAnnuity=PVAnnuity+(C0*C1)/C2$$

Where:

$$C0=Pension+Annuity$$

$$C1=EXP((-L*T+EXP((Age-M)/B)*(1-EXP(T/B))$$

$$C2=(1+r)\hat{\,}T$$

More simply, PVAnnuity is the present value of any periodic after-tax pension and/or annuity cash inflows received by the retiree, adjusted for the probability of the retiree being alive to receive the cash flow.

The final step 508 instructs the algorithm to proceed to the next value of T for each value of T within the established range. Once this process is complete, the value of PVAnnuity will be equal to the actuarial present value of any after-tax pension and annuity income received by the retiree from time T=0 to 122 less the age of retiree. Having computed the value of PVAnnuity, we proceed to step 406 in FIG. 4.

In step 406, we compute the variable Alpha, which is the percentage of the retiree's assets invested in relatively risky assets. In the illustrated embodiment, Alpha is computed using the following formula:

$$Alpha=Risky\ Assets/(RiskyAssets+SafeAssets+PVAnnuity)$$

Having computed the value of Alpha, the system determines whether or not Alpha equals 0 in step 408. If Alpha has a non-zero value, which will most often be the case, we proceed to step 410 wherein the value of gamma (the retiree's level of longevity risk aversion) is computed using the formula:

$$gamma=(Mu-r)/(Alpha*Sigma)$$

In the event that alpha is equal to zero, we proceed to step 412 wherein gamma is assigned a value of 100. Note that gamma can be assigned any value sufficiently large such that 1/gamma becomes a very small number; this has the effect of reducing the optimal withdrawal amount for a retiree who is highly risk averse.

Irrespective of the path chosen at step 408, we compute the Wealth variable at step 414 using the following formula:

$$Wealth=Risky\ Assets+SafeAssets$$

Note that the Wealth variable is the value of financial assets held by the retiree excluding any pension and annuity (or similar) assets.

In the next step 416, the variable Pie is computed by "annualizing" any monthly after-tax pension and income cash flow streams. In the illustrated embodiment, Pie is calculated using the following formula:

$$Pie=12*(Pension+Annuity)$$

We then proceed to step 418 wherein the optimal wealth depletion time (WDT) is assigned an initial value of 20.

Figure 6:
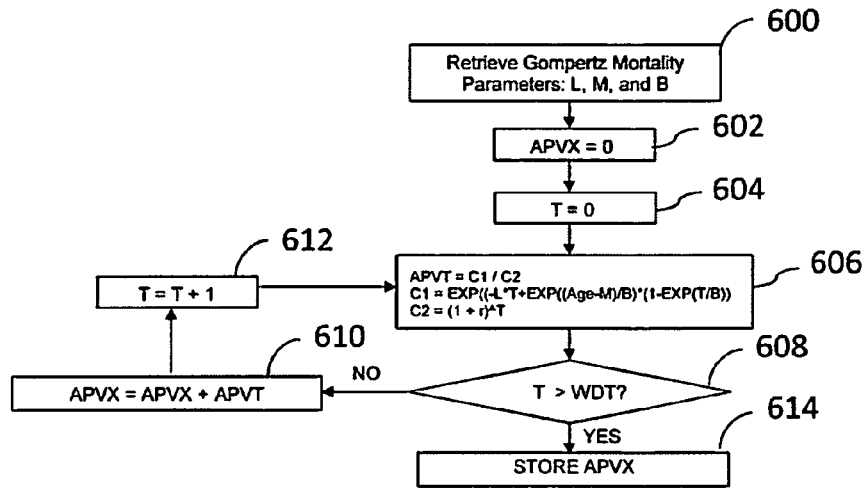
FIG. 6 is a flowchart detail of FIG. 4 illustrating one method for calculating the actuarial discount rate.

In the next step 420, we retrieve the actuarial present value (APVX). FIG. 6 contains a flowchart illustrating the process for calculating the value of APVX. The first step 600 is to retrieve the Gompertz Mortality Parameters (L, M and B). In the next step 602, the initial value of APVX is set equal to 0. The value of T which, loosely speaking, means "time" is set equal to 0 in step 604. The actuarial present value at time T (APVT) is calculated in the next step 606 using the formula:

$$APVT=C1/C2$$

Where:

$$C1=EXP((-L*T+EXP((Age-M)/B)*(1-EXP(T/B))$$

$$C2=(1+r)\hat{\,}T$$

Note that the numerator is the conditional probability of surviving T years given the retiree's age, which has been parameterized on the basis of the Gompertz law of mortality (see equation (5)).

In the next step 608, the system determines whether the value of T exceeds the optimal wealth depletion time (WDT). Where this condition is not satisfied, the value of APVX is increased by the value of APVT (step 610), the value of T is increased by 1 (step 612) and steps 606 to 612 are repeated until the value of T exceeds the value of WDT at step 608. Once T>WDT, the value of APVX is stored (step 614) and retrieved at step 420 (see FIG. 4). For added clarity, the actuarial present value (APVX) from time 0 to WDT is the sum of the individual actuarial present values computed for each value of T ranging from 0 to WDT. The flowchart in FIG. 6 presents one method for integrating these amounts.

Returning to FIG. 4, the next step 422 is to solve the wealth depletion function (WDTF) using the formula:

$$WDTF=N1/D1*A2*A4-Pie$$

Where:

$$N1=(Wealth-A0)*A1-A0$$

$$D1=A5*A1$$

$A2 = \text{EXP}(k*\text{WDT})$ $A4 = \text{POW}(\char`\^3, 1/\text{gamma})$ $A0 = \text{Pie}/r$ $A1 = \text{EXP}(r*\text{WDT})$ $A3 = \text{EXP}((-L*\text{WDT}+\text{EXP}((\text{Age}-M)/B)*(1-\text{EXP}(\text{WDT}/B))$ $A5 = \text{APVX}$ Step 424 verifies whether this condition (WDTF≈0) is satisfied. If the condition is not satisfied, we proceed to step 426 which assesses whether WDTF is greater than or less than 0. If WDTF>0, the value of WDT is increased by $\frac{1}{12}$ (step 428), the value of APVX is recalculated (transition from step 428 to step 420) and the value of WDTF is recalculated (step 422). If WDTF<0, the value of WDT is decreased by $\frac{1}{12}$ (step 430), the value of APVX is recalculated (transition from step 430 to step 420) and the value of WDTF is recalculated (step 422). The value of WDT is adjusted (step 428 or 430) until the wealth depletion function returns a value of 0. Note that the value of APVX must be recalculated since the actuarial present value is a function of the optimal wealth depletion time (WDT) among other variables. When the condition in step 424 is satisfied, we have solved the optimal wealth depletion time (the length of time it will take for the retiree's discretionary wealth to be depleted) and can now compute the optimal withdrawal amount at t=0 (step 432) using the formula:

$\text{OWA} = N2/D2$

Where:

$N2 = (\text{Wealth}+B0)*B1-B0$ $D2 = B2*B1$ $B0 = \text{Pie}/r$ $B1 = \text{EXP}(r*\text{WDT})$ $B2 = \text{APVX}$ In the final step 434, the optimal withdrawal amount (OWA) is displayed or otherwise communicated to the retiree.

Figure 8:
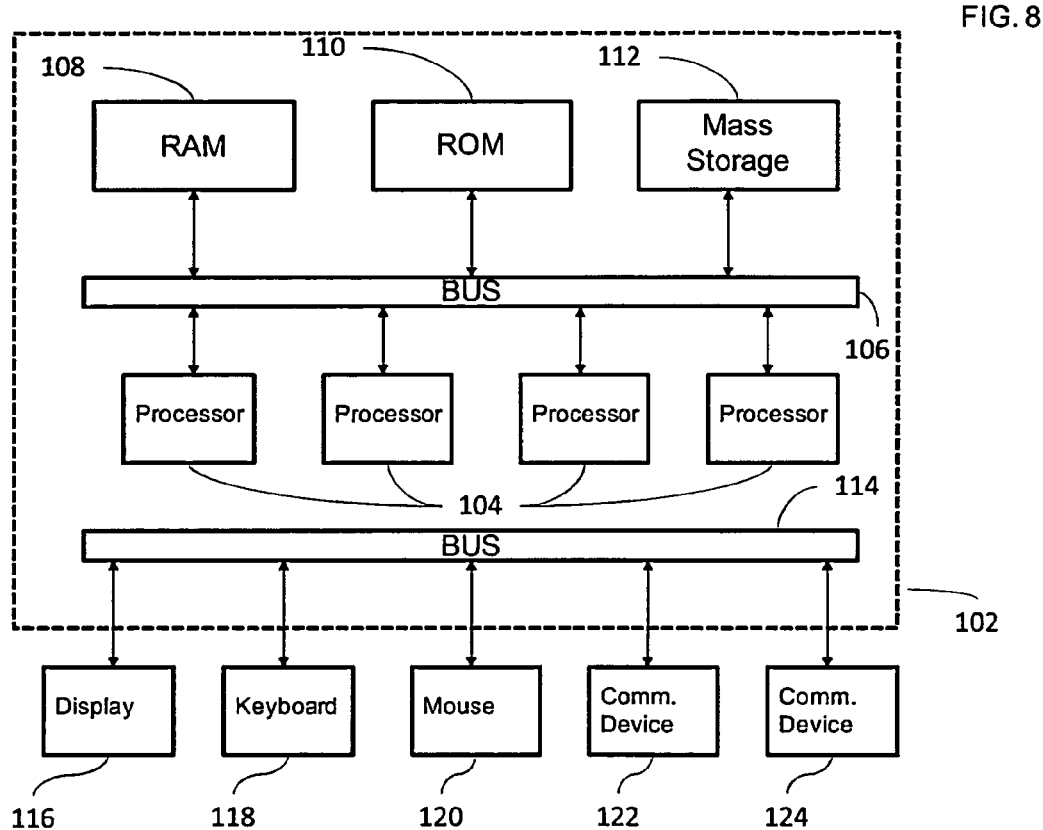
FIG. 8 is a diagram illustrating the typical internal architecture of a server suitable for carrying out the invention.

A representative system for carrying out the invention is displayed in FIG. 8, which shows a high-level schematic internal architecture of server 102. The server 102's main logic is embodied by a general-purpose, programmable microprocessor(s) 104, which in conventional practice will have an on-board memory cache (not shown) and which may be associated with one or more mathematical or other special-purpose coprocessors. The processing logic represented by processor 104 is connected by a bus structure 106 to the various other components of server 102. To execute the algorithm shown in FIGS. 4, 5 and 6, where that algorithm is written in a programming language, at least a dual core processor is recommended.

The schematic representation of bus 106 is illustrated in FIG. 8 as a simple and unitary structure; however, in conventional practice, as is known by anyone skilled in the art, there are usually several buses (see, for example, bus 114) and communication pathways that operate at different speeds and have multiple purposes.

Server 102 will also have random access memory (RAM) units 108 connected to bus 106. RAM 108 (DRAM, SDRAM, or other known types) typically has loaded into it the operating system of the server 102 and executable instructions for one or more special applications designed to carry out the invention.

In a typical architecture, a computer program suitable for carrying out the invention will be stored on a mass storage device 112, such as an optical disk, magnetic drive, or a solid state drive. The data for both relatively safe and relatively risky assets, used to compute the retiree's level of longevity risk aversion, and Gompertz mortality parameters (L, M, and B), will typically reside on a separate database server 126 that can be accessed remotely through the Internet 130; in the alternative, the data could exist as a database on device 112. Bus 106 connects mass storage device 112 to RAM 108. In the preferred embodiment, an operator using computer 128 can manage information stored on database 126 through the medium of the Internet 130, as shown in FIG. 7.

The server 102 is connected to various peripheral devices used to communicate with an operator, such as display 116, keyboard 118, and mouse 120. The server 102 also uses a communications device 122 such as on-board network connectivity or an attached network card to communicate to other computers and equipment. This allows the operator to input programming instructions directly onto server 102, among other things. In the preferred embodiment, an operator using computer 128 can upload programming instructions to server 102 through the medium of the Internet 130.

As previously described, the optimal withdrawal amount (OWA) may be used to periodically recommend optimal levels of withdrawals from a retiree's portfolio accounts. In FIG. 7, the server 102 calculates the optimal withdrawal amount (OWA) based in part on data obtained from database 126. Other inputs used in calculating the optimal withdrawal amount (OWA) can be input by a retiree from a remote computer 132 and then transmitted to server 102 through the medium of the Internet 130. These data may include, for example, the retiree's wealth, current asset allocations to relatively risky and relatively safe assets, age, health status, and any pension and annuity income amounts. Once the optimal withdrawal amount (OWA) has been calculated by server 102, the result is transmitted through the medium of the internet 130 and displayed on retiree computer 132.

In an alternative embodiment of the invention, the end user would install the computer software on a personal computer or similar device. A representative system for carrying out the invention, under this alternative scenario, is illustrated in FIG. 7A. A system for maximizing the utility of consumption during retirement 100 may be assembled around a programmed, general-purpose computer 102 having personal computer ("PC") architecture.

Figure 8A:
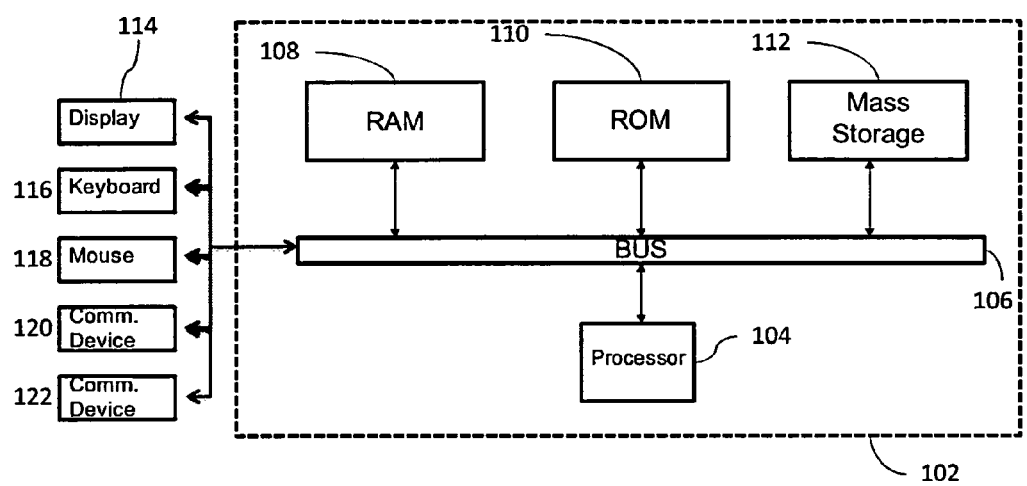
FIG. 8A is a diagram illustrating the typical internal architecture of a personal computer suitable for carrying out the invention.

Referring to FIG. 8A, a highly schematic internal architecture of computer 102 is shown. In the preferred embodiment, computer 102's main logic is embodied by a general-purpose, programmable microprocessor 104. The microprocessor 104 will, in conventional practice, have an on-board memory cache (not shown) and may be associated with one or more mathematics or other special-purpose coprocessors (not shown). The processing logic represented by microprocessor 104 is connected via bus structure 106 to the other components of the computer 102. To execute the algorithm shown in FIGS. 4, 5 and 6, where that algorithm is written in a programming language, at least a dual core processor is recommended.

The schematic representation of bus 106 appears in FIG. 8A as a simple and unitary structure; however, in practice, as is known to those in the art, there are usually several buses and communication pathways 106 operating at different speeds and having different purposes. Furthermore, bus 106 may be segmented and controlled by bus controllers, as is also known in the art.

Computer 102 will also have a random access memory (RAM) unit, or units, 108 connected to bus 106. RAM 108 (which may be DRAM, SDRAM or other known types) typically has loaded into it the operating system of the computer 102 and executable instructions for one or more special applications designed to carry out the invention.

In a standard architecture, a computer program suitable for carrying out the invention will be stored on a mass storage device 112, such as an optical disk or magnetic hard drive. Bus 106 connects mass storage device 112 to RAM 108. The asset data used to compute the retiree's level of longevity risk aversion, and Gompertz mortality parameters (L, M, and B), will typically exist as a database on device 112 but it could also reside on a separate database server and be accessed remotely through a network.

The computer 102 is connected to peripheral devices used to communicate with an operator, such as display 114, keyboard 116, mouse 118, and printer 120. The computer 102 also uses a communications device 122 such as a modem or a network card to communicate to other computers and equipment.

As previously described, the optimal withdrawal amount (OWA) may be used to periodically recommend optimal levels of withdrawals from a retiree's portfolio accounts. In FIG. 7-A, computer 102 calculates the optimal withdrawal amount (OWA) based, in part, on data obtained from database 112. Other inputs used in calculating the optimal withdrawal amount (OWA) can be input by the user from the keyboard 116 and mouse 118. Once computer 102 has calculated the optimal withdrawal amount (OWA), the result is displayed on display 114.

In yet another embodiment, the end user would install the application on a personal hand-held device such as a Tablet computer or a so-called Smart Phone device. The device's main logic is embodied by a general-purpose, programmable processor. The processing logic represented by the processor is connected to the other components such as a screen/panel, memory (both volatile and non-volatile), network communications components, and other peripheral devices.

As in other embodiments, the tablet or smart phone device will also have a memory which has loaded onto it the operating system of the tablet or smart phone device and executable instructions for one or more special applications designed to carry out the invention.

In a standard architecture, a computer program suitable for carrying out the invention will be stored on a non-volatile memory such as a flash device. The asset data used to compute the retiree's level of longevity risk aversion, and Gompertz mortality parameters (L, M, and B), will typically exist as a database on the device but it could also reside on a separate database server and be accessed remotely through the device's communications components.

As previously described, the optimal withdrawal amount (OWA) may be used to periodically recommend optimal levels of withdrawals from a retiree's portfolio at the beginning of the period. The tablet or smart phone device's processor calculates the optimal withdrawal amount (OWA) based, in part, on data obtained from the database. Other inputs used in calculating the optimal withdrawal amount (OWA) can be input by the user from the keypad. Once the device has calculated the optimal withdrawal amount (OWA), the result is displayed on the device's screen.

Examples

Table 1, in Appendix B, shows the optimal withdrawal amount for a retiree under different age and pension assumptions. At age 65, the retiree has $1,000,000 in assets in his portfolio of which $350,000 (35%) is invested in relatively risky assets and the remaining $650,000 (65%) is invested in relatively safe assets. The portfolio is assumed to grow at a rate of 3.9%. The retiree's level of longevity risk aversion risk aversion (gamma) is assumed to be 2.14 units. All of this is assuming the real expected rate of return on a portfolio of relatively risky assets is 5.5%, the standard deviation of return on that portfolio is 20%, and the valuation rate is 2.5%.

At age 65, assuming no pension, our retiree would be advised to withdraw $61,920 from his retirement portfolio. At age 80, the same retiree would have $590,000 remaining in his portfolio (not displayed in table and assuming market conditions remain constant) and would be advised to withdraw $53,940 from the portfolio. As we move from left to right, in any given row, note that the recommended withdrawal declines. A retiree who weighs the utility of future spending by his probability of survival values spending today more highly than spending at points further into the future—the probability of being alive to spend in the distant future is far lower than the probability of being alive to spend in the near future. Accordingly, the optimal pattern requires that the retiree gradually reduce the level of his portfolio withdrawals as he ages, as the results from the table confirm. Put another way, our retiree deals with longevity risk by setting aside a financial reserve and planning to reduce spending in proportion to the probability of survival, which is linked to his risk aversion, should that risk materialize.

The table also shows that our retiree consumes more from his portfolio at higher levels of pension income. For example, at age 70 with a pension of $50,000 per year, our retiree would withdraw $74,070 from his portfolio. In contrast, with a pension of only $20,000 per year, the retiree would consume $66,900 from his portfolio at age 70. In essence, the pension serves as a buffer and enables the retiree to spend more from discretionary wealth. The retiree is not as concerned with longevity risk because he has pension income to fall back on should that risk (i.e. living longer than anticipated) materialize.

Table 2 in Appendix A shows the optimal withdrawal amount for four retirees with different levels of longevity risk aversion (gamma values). The retirees are identical in every other respect. Each has a portfolio of assets valued at $1,000,000 at age 65 and each retiree's portfolio is growing at 4.5%. Assuming identical portfolio growth rates for retirees with different asset allocations is highly unrealistic; that said, this treatment is necessary to isolate the effect of changes in longevity risk aversion on optimal spending levels. Gamma values are computed assuming the expected rate of return on a portfolio comprised solely of relatively risky assets is 5.5% and the valuation rate is 1.5%. Furthermore, it is assumed that the retiree has zero pension or other annuity income.

The results in Table 2 confirm that, in the vast majority of cases, a lower level of longevity risk aversion (representing higher risk tolerance) allows the retiree to consume more from their nest egg at any given age.

What is claimed is:

1. A computer implemented method for calculating, by a computer processor, an optimal withdrawal amount from a retiree's portfolio accounts consisting of financial assets, the method comprising the steps of:

Retrieving a current value of assets of the retiree pre-determined to be relatively risky, and a current value of assets of the retiree pre-determined to be relatively safe;

Retrieving total after-tax amount of pension and annuity funds receivable by the retiree per time unit, which is referred to as Pie;

Calculating financial wealth of the retiree at time 0, which is referred to as W(0), as the sum of the current value of the relatively risky assets and the current value of the relatively safe assets;

Retrieving a valuation rate, which is referred to as R, of the retiree;

Calculating the retiree's level of longevity risk aversion, which is referred to as LRA;

Calculating, by the processor, the retiree's optimal wealth depletion time, which is referred to as WDT, by solving the equation OWA(WDT)−Pie=0, where OWA(T) is the retiree's estimated optimal withdrawal amount at time T, and OWA(T) is calculated by performing the steps of:
    calculating actuarial present value for time T, which is referred to as APVX(T);
    calculating A0=Pie/R;
    calculating A1=EXP(R*T);
    calculating N1=(W(0)+A0)*A1−A0;
    calculating D1=APVX(T)*A1;
    retrieving a subjective discount rate, which is referred to as SDR, of the retiree;
    calculating K=(R−SDR)/LRA;
    calculating A2=EXP(K*T);
    calculating A3=the conditional probability of the retiree surviving for T time units;
    calculating A4=A3^(1/LRA); and
    calculating OWA(T)=N1/D1*A2*A4;

Calculating, by the processor, the retiree's optimal withdrawal amount at time 0, which is referred to as OWA(0), by performing the steps of:
    Calculating B1=EXP(R*WDT);
    Calculating N2=(W(0)+Pie/R)*B1−(Pie/R);
    Calculating actuarial present value for time WDT, which is referred to as APVX(WDT); and
    Calculating OWA(0)=N2/APVX(WDT)/B1; and Displaying or communicating the value of OWA(0) to the retiree.

2. The method of claim 1, wherein the relatively risky and relatively safe assets have different risk and return characteristics.

3. The method of claim 1, wherein Pie is equal to 0.

4. The method of claim 1, further comprising the step of calculating Alpha being the current value of the retiree's relatively risky assets divided by the sum of W(0) and the present value of the retiree's after-tax pension and annuity income, wherein LRA is calculated as the Sharpe ratio inversely scaled by Alpha.

5. The method of claim 4, further comprising the steps of:
retrieving an expected rate of return on a portfolio of relatively risky assets, which is referred to as Mu; and
retrieving a standard deviation of returns for a portfolio of relatively risky assets, which is referred to as Sigma,
wherein LRA is calculated as ((Mu−R)/Sigma)/Alpha if Alpha is not equal to 0 and a relatively large number otherwise.

6. The method of claim 5, wherein the relatively large number is 100.

7. The method of claim 1, wherein solving OWA(WDT)−Pie=0 comprises the steps of:
(a) setting a provisional time estimate WDTprte equal to a pre-determined initial estimate of WDT;
(b) calculating the retiree's optimal withdrawal amount (OWA(WDTprte)) for the provisional time estimate;
(c) if OWA(WDTprte)−Pie is equal to 0 then setting WDT=WDTprte, otherwise if OWA(WDTprte)−Pie is greater than 0 then increasing the value of WDTprte and repeating steps (b) and (c), otherwise if OWA(WDTprte)−Pie is less than 0 then decreasing the value of WDTprte and repeating steps (b) and (c), wherein equality of OWA(WDTprte)−Pie with 0 is evaluated based on the size of the increases and decreases in the value of WDTprte.

8. The method of claim 1, wherein APVX(T) is calculated as the sum of individual actuarial present values APV(Ti) computed for each value of time Ti ranging from 0 to T time units, where APV(Ti) is calculated as the conditional probability of the retiree surviving for Ti time units divided by $(1+R)^{Ti}$.

9. The method of claim 8, wherein the conditional probability of the retiree surviving for a particular number of time units is calculated using the Gompertz-Makeham Law of Mortality.

10. The method of claim 7, wherein the time unit is one year, and wherein in step (c) of solving the equation OWA(WDT)−Pie=0, if OWA(WDTprte)−Pie is greater than 0 then the value of WDTprte is increased by one month and steps (b) and (c) are repeated, and if OWA(WDTprte)−Pie is less than 0 then the value of WDTprte is decreased by one month and steps (b) and (c) are repeated.

11. The method of claim 10, wherein the pre-determined initial estimate of the WDT is 20 years.

12. The method of claim 7, wherein the increase or decrease in the value of WDTprte is calculated using Newton's method.

13. The method of claim 7, wherein the increase or decrease in the value of WDTprte is calculated using a bisection method.

14. A non-transitory machine-readable medium storing a computer program that, when executed by a processor, causes the processor to perform the following steps:
retrieve a current value of assets of the retiree pre-determined to be relatively risky, and a current value of assets of the retiree pre-determined to be relatively safe;
retrieve total after-tax amount of pension and annuity funds receivable by the retiree per time unit, which is referred to as Pie;
calculate financial wealth of the retiree at the time 0, which is referred to as W(0), as the sum of the current value of the relatively risky assets and the current value of the relatively safe assets;
retrieve a valuation rate, which is referred to as R, of the retiree;
calculate the retiree's level of longevity risk aversion, which is referred to as LRA;
calculate the retiree's optimal wealth depletion time, which is referred to as WDT, by solving the equation OWA(WDT)−Pie=0, where OWA(T) is the retiree's estimated optimal withdrawal amount at time T, and OWA(T) is calculated by performing the steps of:
    calculating an actuarial present value for time T, which is referred to as APVX(T);
    calculating A0=Pie/R;
    calculating A1=EXP(R*T);
    calculating N1=(W(0)+A0)*A1−A0;
    calculating D1=APVX(T)*A1;
    retrieving a subjective discount rate, which is referred to as SDR, of the retiree;
    calculating K=(R−SDR)/LRA;
    calculating A2=EXP(K*T);
    calculating A3=the conditional probability of the retiree surviving for T time units;

calculating A4=A3^(1/LRA); and
calculating OWA(T)=N1/D1*A2*A4;
calculate the retiree's optimal withdrawal amount at time 0, which is referred to as OWA(0), by performing the steps of:
Calculating B1=EXP(R*WDT);
Calculating N2=(W(0)+Pie/R)*B1−(Pie/R);
Calculating actuarial present value for time WDT, which is referred to as APVX(WDT); and
Calculating OWA(0)=N2/APVX(WDT)/B1; and
display or otherwise communicate the value of OWA(0) to the retiree.

15. The non-transitory machine-readable medium of claim 14, wherein relatively risky and relatively safe assets have different risk and return characteristics.

16. The non-transitory machine-readable medium of claim 14, wherein Pie is equal to 0.

17. The non-transitory machine-readable medium of claim 14, wherein the computer program, when executed by the processor, further causes the processor to calculate Alpha being the current value of the retiree's relatively risky assets divided by the sum of W(0) and the present value of the retiree's after-tax pension and annuity income, wherein LRA is calculated as the Sharpe ratio inversely scaled by Alpha.

18. The non-transitory machine-readable medium of claim 17, wherein the computer program, when executed by the processor, further causes the processor to:
retrieve an expected rate of return on a portfolio of relatively risky assets, which is referred to as Mu; and
retrieve a standard deviation of returns for a portfolio of relatively risky assets, which is referred to as Sigma,
wherein the LRA is calculated as ((Mu−R)/Sigma)/Alpha if Alpha is not equal to 0 and a relatively large number otherwise.

19. The non-transitory machine-readable medium of claim 18, wherein the relatively large number is 100.

20. The medium of claim 18, wherein solving the equation OWA(WDT)−Pie=0 comprises the steps of:
(a) setting a provisional time estimate (WDTprte) equal to a pre-determined initial estimate of WDT;
(b) calculating the retiree's optimal withdrawal amount (OWA(WDTprte)) for the provisional time estimate;
(c) if OWA(WDTprte)−Pie is equal to 0 then setting WDT=WDTprte, otherwise if OWA(WDTprte)−Pie is greater than 0 then increasing the value of WDTprte and repeating steps (b) and (c), otherwise if OWA(WDTprte)−Pie is less than 0 then decreasing the value of WDTprte and repeating steps (b) and (c), wherein equality of OWA(WDTprte)−Pie with 0 is evaluated based on the size of the increases and decreases in the value of WDTprte.

21. The medium of claim 18, wherein APVX(T) is calculated as the sum of individual actuarial present values APV(Ti) computed for each value of time Ti ranging from 0 to T time units, where APV(Ti) is calculated as the conditional probability of the retiree surviving for Ti time units divided by $(1+R)^{Ti}$.

22. The non-transitory machine-readable medium of claim 21, wherein the conditional probability of the retiree surviving for a particular number of time units is calculated using the Gompertz-Makeham Law of Mortality.

23. The non-transitory machine-readable medium of claim 20, wherein the time unit is one year, and wherein in step (c) of solving the equation OWA(WDT)−Pie=0, if OWA(WDTprte)−Pie is greater than 0 then the value of WDTprte is increased by one month and steps (b) and (c) are repeated, and if OWA(WDTprte)−Pie is less than 0 then the value of WDTprte is decreased by one month and steps (b) and (c) are repeated.

24. The non-transitory machine-readable medium of claim 23, wherein the pre-determined initial estimate of the WDT is 20 years.

25. The non-transitory machine-readable medium of claim 20, wherein the increase or decrease in the value of WDTprte is calculated using Newton's method.

26. The non-transitory machine-readable medium of claim 20, wherein the increase or decrease in the value of WDTprte is calculated using a bisection method.

27. A system for calculating an optimal withdrawal amount from a retiree's portfolio accounts comprising relatively risky and relatively safe assets, the system comprising:
a computer processor;
a display screen on which the computer processor can display data;
a non-transitory memory storing computer readable instructions that, when executed by the computer processor, cause the computer processor to:
retrieve a current value of assets of the retiree pre-determined to be relatively risky, and a current value of assets of the retiree pre-determined to be relatively safe;
retrieve total after-tax amount of pension and annuity funds receivable by the retiree per time unit (Pie);
calculate financial wealth of the retiree at time 0, which is referred to as W(0), as the sum of the current value of the relatively risky assets and the current value of the relatively safe assets;
retrieve a valuation rate, which is referred to as R, of the retiree;
calculate the retiree's level of longevity risk aversion, which is referred to as LRA;
calculate the retiree's optimal wealth depletion time, which is referred to as WDT, by solving the equation OWA(WDT)−Pie=0, where OWA(T) is the estimated financial capital of the retiree at time T, and OWA(T) is calculated by performing the steps of:
calculating actuarial present value for time T, which is referred to as APVX(T);
calculating A0=Pie/R;
calculating A1=EXP(R*T);
calculating N1=(W(0)+A0)*A1−A0;
calculating D1=APVX(T)*A1;
retrieving a subjective discount rate, which is referred to as SDR, of the retiree;
calculating K=(R−SDR)/LRA;
calculating A2=EXP(K*T);
calculating A3=the conditional probability of the retiree surviving for T time units;
calculating A4=A3^(1/LRA); and
calculating OWA(T)=N1/D1*A2*A4;
calculate the retiree's optimal withdrawal amount at time 0, which is referred to as OWA(0), by performing the steps of:
calculating B1=EXP(R*WDT);
calculating N2=(W(0)+Pie/R)*B1−(Pie/R);
calculating actuarial present value for time WDT, which is referred to as APVX(WDT); and
calculating OWA(0)=N2/APVX(WDT)/B1; and
display or otherwise communicate the value of OWA(0) to the retiree.

28. The system of claim 27, wherein the relatively risky and relatively safe assets have different risk and return characteristics.

29. The system of claim 27, wherein Pie is equal to 0.

30. The system of claim 27, wherein the computer readable instructions further cause the computer processor to:
calculate Alpha being the current value of the retiree's relatively risky assets divided by the sum of W(0) and the present value of the retiree's after-tax pension and annuity income, wherein the LRA is calculated as the Sharpe ratio inversely scaled by Alpha.

31. The system of claim 30, wherein the computer readable instructions further cause the computer processor to:
retrieve an expected rate of return on a portfolio of relatively risky assets, which is referred to as Mu; and
retrieve a standard deviation of returns for a portfolio of relatively risky assets, which is referred to as Sigma, wherein LRA is calculated as ((Mu−R)/Sigma)/Alpha if Alpha is not equal to 0 and a relatively large number otherwise.

32. The system of claim 31, wherein the relatively large number is 100.

33. The system of claim 31, wherein solving the equation OWA(WDT)−Pie=0 comprises the steps of:
(a) setting a provisional estimated time WDTprte equal to a pre-determined initial estimate of WDT;
(b) calculating the retiree's optimal withdrawal amount (OWA(WDTprte)) for the provisional time estimate;
(c) if OWA(WDTprte)−Pie is equal to 0 then setting WDT=WDTprte, otherwise if OWA(WDTprte)−Pie is greater than 0 then increasing the value of WDTprte and repeating steps (b) and (c), otherwise if OWA(WDTprte)−Pie is less than 0 then decreasing the value of WDTprte and repeating steps (b) and (c), wherein equality of OWA(WDTprte)−Pie with 0 is evaluated based on the size of the increases and decreases in the value of WDTprte.

34. The system of claim 31, wherein the actuarial present value for time Tn, which is referred to as APVX(Tn), is calculated as the sum of individual actuarial present values APV(T) computed for each value of time T ranging from 0 to Tn time units, where APV(T) is calculated as the conditional probability of the retiree surviving for T time units divided by $(1+R)^T$.

35. The system of claim 34, wherein the conditional probability of the retiree surviving for a particular number of time units is calculated using the Gompertz-Makeham Law of Mortality.

36. The system of claim 33, wherein the time unit is one year, and wherein in step (c) of solving the equation OWA(WDT)−Pie=0, if OWA(WDTprte)−Pie is greater than 0 then the value of WDTprte is increased by one month and steps (b) and (c) are repeated, and if OWA(WDTprte)−Pie is less than 0 then the value of WDTprte is decreased by one month and steps (b) and (c) are repeated.

37. The system of claim 36, wherein the pre-determined initial estimate of the WDT is 20 years.

38. The system of claim 33, wherein the increase or decrease in the value of WDTprte is calculated using Newton's method.

39. The system of claim 33, wherein the increase or decrease in the value of WDTprte is calculated using a bisection method.

\* \* \* \* \*